United States Patent
Ethier

Patent Number: 5,975,444
Date of Patent: Nov. 2, 1999

[54] APPARATUS AND METHOD FOR PROCESSING MATERIAL

[76] Inventor: Albert Ethier, 110 Saguenay Dk., Saskatoon Sask, Canada, 87K 4G2

[21] Appl. No.: 09/140,246

[22] Filed: Aug. 26, 1998

[51] Int. Cl.[6] .............................. B02C 13/04; B02C 21/02
[52] U.S. Cl. ....................... 241/27; 241/101.76; 241/194; 241/605
[58] Field of Search .............................. 241/101.76, 194, 241/605, 27, 28

[56] References Cited

U.S. PATENT DOCUMENTS

| | | | |
|---|---|---|---|
| 4,360,167 | 11/1982 | Beccarlori et al. | 241/101.7 X |
| 4,449,672 | 5/1984 | Morlock et al. | 241/101.76 |
| 4,524,916 | 6/1985 | Keyes et al. | 241/101.76 X |
| 4,594,041 | 6/1986 | Hostetler | 414/24.5 |
| 4,621,776 | 11/1986 | Hostetler | 241/101.7 |
| 4,779,810 | 10/1988 | Frey | 241/101.7 X |
| 4,789,289 | 12/1988 | Wilson | 241/605 X |
| 4,830,292 | 5/1989 | Frey | 241/101.7 X |
| 5,025,992 | 6/1991 | Niebur | 241/101.76 |
| 5,211,345 | 5/1993 | Siebenga | 241/101.76 |
| 5,333,799 | 8/1994 | Posthumus | 241/27 |
| 5,601,241 | 2/1997 | Brewster | 241/101.76 |
| 5,653,394 | 8/1997 | Bussiere et al. | 241/101.742 |
| 5,813,616 | 9/1998 | Vandervalk | 241/101.76 |

FOREIGN PATENT DOCUMENTS

| | | |
|---|---|---|
| 1039242 | 9/1978 | Canada . |
| 1063559 | 10/1979 | Canada . |
| 1096819 | 3/1981 | Canada . |

*Primary Examiner*—John M. Husar
*Attorney, Agent, or Firm*—Nikolai, Mersereau & Dietz, P.A.

[57] ABSTRACT

There is provided a new apparatus for use in the processing of a mass of material in which the mass is of any size or shape. The apparatus comprises a container which has a cutter within a space in the container. The cutter is rotationally driven about an axis. There is provided an adjustable loader for releasably engaging the mass and moving the mass into the container for engagement with the cutter. There is also provided a discharge for selectively discharging processed material from the container.

19 Claims, 4 Drawing Sheets

APPARATUS AND METHOD FOR PROCESSING MATERIAL

FIELD OF THE INVENTION

This invention relates to an apparatus and method for use in the processing of a mass of material, such as a hay bale.

BACKGROUND OF THE INVENTION

A new process on the market today produces hay bales in large rectangular configuration, in addition to the standard round configuration which is still very prevalent. The rectangular bales can measure up to approximately four feet square by nine feet long, or more. This new much larger configuration poses a problem with regards to processing and at present, there is no satisfactory method of processing these large bales whether it is for feeding, disintegrating or simply spreading the material.

There are currently several time consuming and inefficient methods being used to unpack these large bales so that the contents can be used. These solutions are hindered in many ways by the equipment available today, which equipment is designed for round bales of standard size and weight. That equipment, it if were to be used on rectangular bales would result in a considerable amount of waste of material and time. Thus, the existing equipment fails to provide a means by which the user can process any size of bale currently produced and discharge the material in a controlled manner as feed for livestock, spreading as ground cover or even simple disintegration and disposal.

Some of the apparatus known to the applicant which suffer from some or all of the disadvantages outlined above include: U.S. Pat. No. 4,360,167 of Beccalori et al., issued Nov. 23, 1982; U.S. Pat. No. 4,449,672 of Morlock et al., issued May 22, 1984; U.S. Pat. No. 4,524,916 of Keyes et al., issued Jun. 25, 1985; U.S. Pat. No. 4,621,776 of Hostetler, issued Nov. 11, 1986; U.S. Pat. No. 4,954,041 also of Hostetler, issued Jun. 10, 1986; U.S. Pat. No. 5,601,241 of Brewster, issued Feb. 11, 1997; U.S. Pat. No. 5.653,394 of Bussiere et al., issued Aug. 5, 1997; U.S. Pat. No. 4,779,810 of Frey, issued Oct. 25, 1988; U.S. Pat. No. 4,830,292 also of Frey, issued May 16, 1989; Canadian Patent 1,096,819 of Fry, issued Mar. 3, 1981; Canadian Patent 1,063,559 of Hostetler, issued Oct. 2, 1979; and Canadian Patent 1,039,242 of Honomichl, issued Sep. 26, 1978.

SUMMARY OF THE INVENTION

It is thus an object of the present invention to provide an improved apparatus for use in the processing of a mass of material, such as a hay bale, of any size or shape.

In one aspect of the invention, there is provided an apparatus for use in the processing of a mass of material in which the mass is of any size or shape. The apparatus comprises a container which has a cutter within a space in the container. The cutter is rotationally driven about an axis. There is provided an adjustable loading means for releasably engaging the mass and moving the mass into the container for engagement with the cutter. There is also provided a discharge means for selectively discharging processed material from the container.

In another aspect of the invention, the container comprises a bottom, a first and second end and a first side which is preferably closed and a second side. The second side is moveable between a first position in which the second side is open and a second position in which the second side is closed, so that the bottom, the first and second ends and the first and second sides define the space.

In another aspect of the invention, the loading means extends outwardly from the second side and is provided with pivot connection means so as to pivotally connect the loading means to the second side.

In another aspect of the invention, the loading means is provided with pivot connection means so as to pivotally connect the loading means to the second side. The loading means comprises a first arm extending outwardly from an end of the second side and a second arm extending normal to the first arm and inwardly from the first arm so as to form a U-shaped collection space with the first arm and the second side.

In another aspect of the invention, the first arm comprises an outer part and an inner part in telescoping arrangement so as to permit adjustment of the length of the first arm.

In another aspect of the invention, the second arm comprises at least one protrusion extending from the second arm into the collection space towards the second side, the protrusion constructed so as to operatively retain the mass of material.

In another aspect of the invention, the cutter comprises a drum rotatable about the axis, which axis is horizontal. The drum has a plurality of flails affixed thereto and projecting outwardly therefrom.

There is also provided a method for the processing and discharge of a mass of material within in apparatus as described herein. The method comprises the steps of: moving the container into a position so that the second side is proximate to the mass; lowering the loading means and adjusting the length which the loading means projects outwardly from the second side so as to engage the mass on a side of the mass remote from the second side; bringing the loading means into contact with the mass so as to engage the mass; lifting the loading means and the second side, with the mass being retained by the loading means, so as to bring the mass into contact with the cutter while the cutter is rotated so as to process the material; and discharging the processed material.

There is thus provided an apparatus for use in the processing of a mass material which is easily operable by an operator and which can readily adapt to lift, load and process any size or shape of material, such as hay bales of rectangular or circular configuration.

BRIEF DESCRIPTION OF THE DRAWINGS

These and other advantages of the invention will become apparent upon reading the following detailed description and upon referring to the drawings in which.

Figure 1:
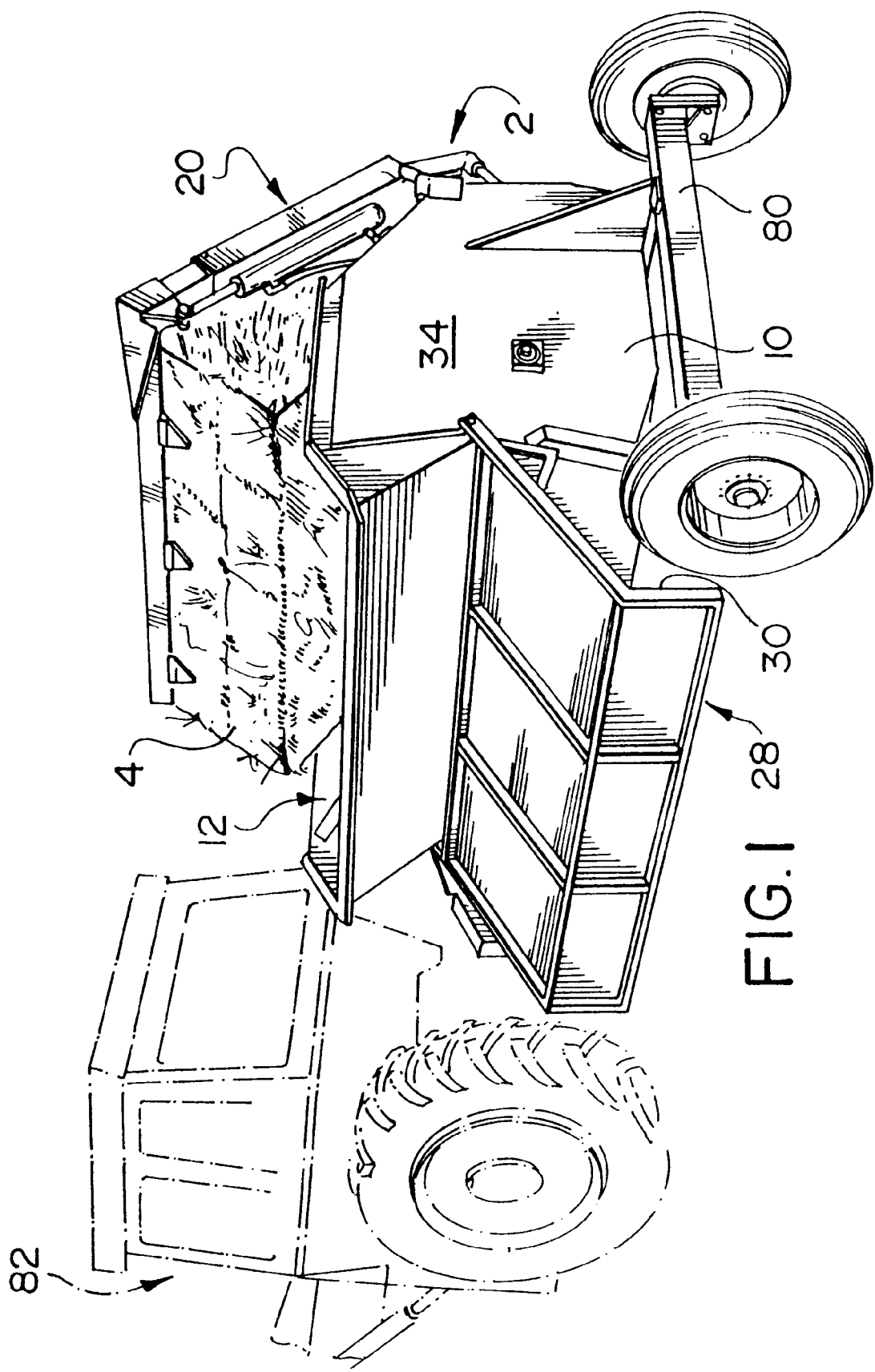
FIG. 1 is a perspective view of the apparatus in accordance with the present invention.
Figure 2:
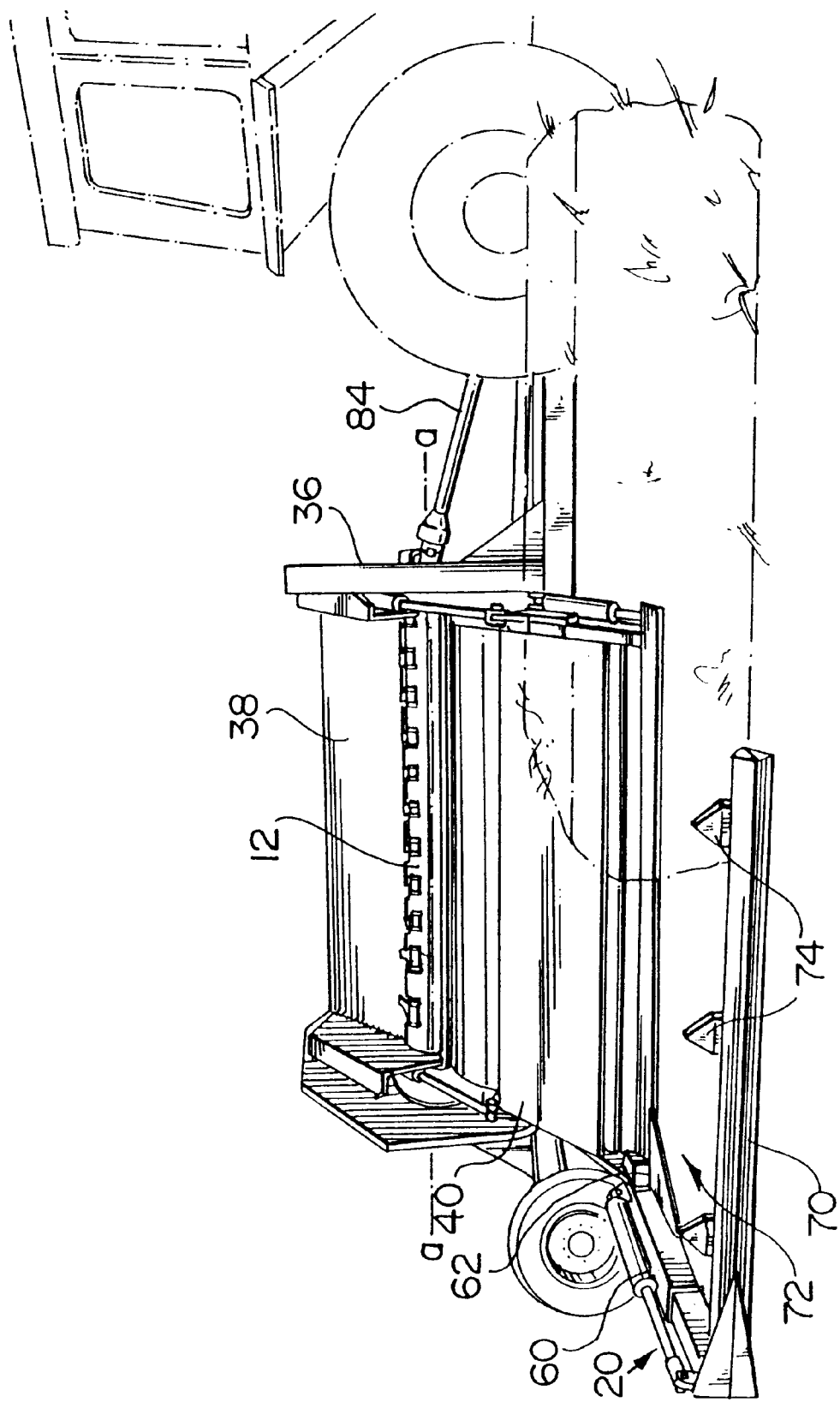
FIG. 2 is a side elevation of the apparatus shown in FIG. 1.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1 illustrates an apparatus 2 suitable for use in the processing and discharge of a mass of material 4, regardless of the size or shape of the mass of material 4. Although the apparatus 2 is contemplated for use in the processing of bales of fibrous materials, such as the rectangular hay bale shown, it can be used for any other material which is capable of being processed, cut or the like.

With greater reference to all of the drawings, the apparatus 2 is provided with a container 10 which has a space 12 which houses a cutter 14 suitable for the processing of fibrous material such as hay or straw. The cutter 14 is driven about an axis a—a which is preferably horizontal, although it is feasible and contemplated for the axis to be inclined toward the vertical within the space 12.

Figure 3:
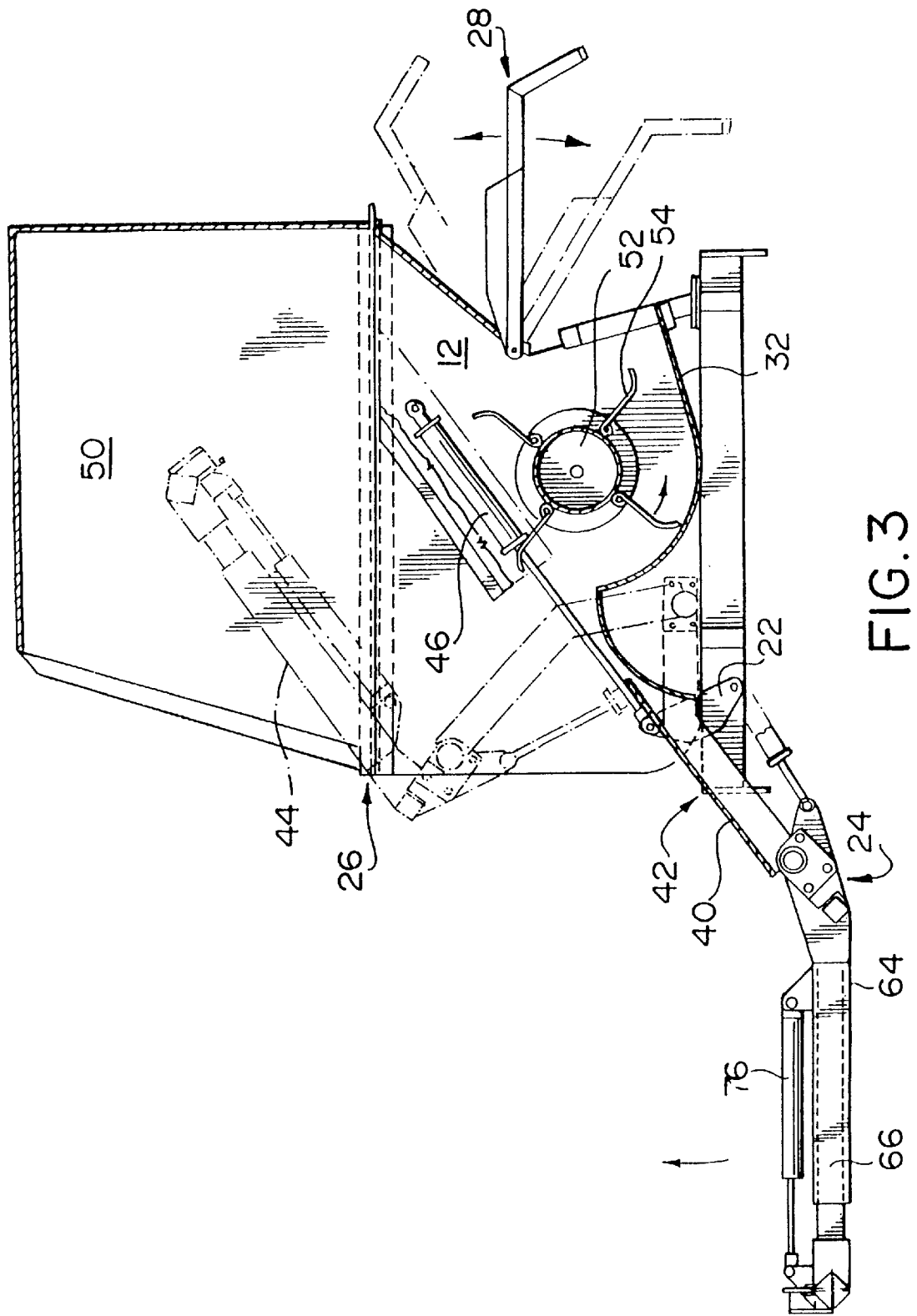
FIG. 3 is a cross-section of the apparatus shown in FIG. 2.
Figure 4A:
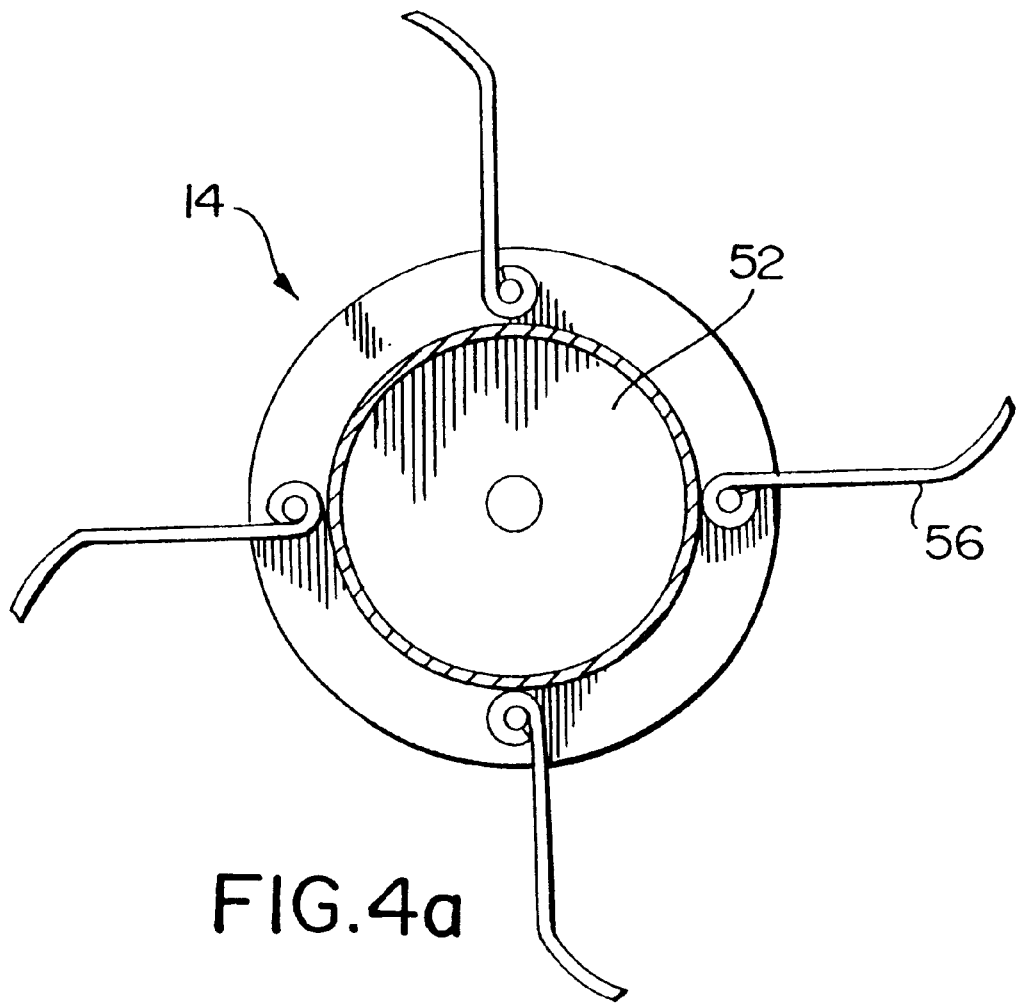
FIGS. 4a and 4b are cross-sections of preferred embodiments of the cutter of the present invention.
Figure 4B:
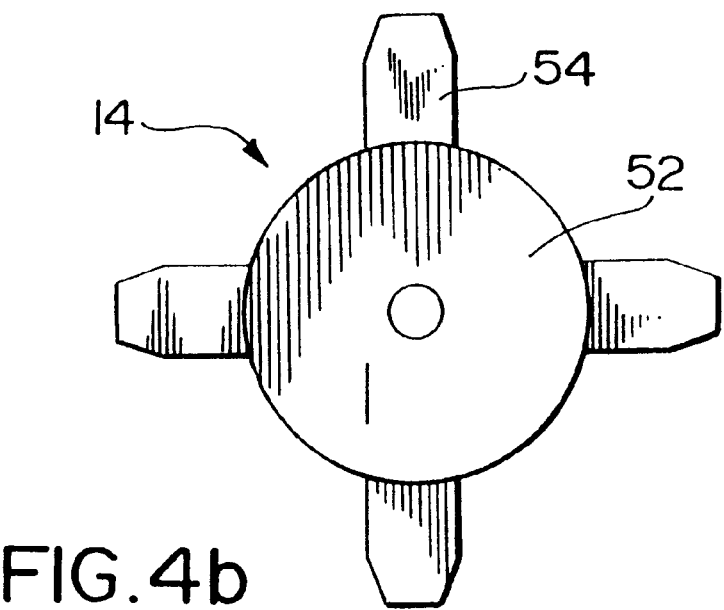

The apparatus further comprises a loader 20 which is adjustable in length and which is connected to the container 10 by means of a pivot connection 22 so as to allow the loader to rotationally pivot relative to the container 10 from a position 24 close to the ground to a position 26 as illustrated in FIG. 1 and shown in phantom in FIG. 3, where the mass of material 4 can be brought in contact with the cutter 14. A discharge 28 from the container 10 is also provided so as to allow the selective discharge of the processed material from the apparatus 2. The discharge 28 may be in the form of a chute 30 or other suitable openings in the container 10 to allow for the processed material to be removed from the container 10 and spread as required about the apparatus 2. The discharge 28 is adjustable in position, as shown in FIG. 3.

The container has a bottom surface 32, a first end 34 and an opposing second end 36. There is a first side 38 which is preferably closed, but can be moved into an open position if required, and a second side 40 which is constructed so as to be moveable between an open position, shown generally at 42 and a closed position shown generally at 44. Hydraulic controls 46, such as the pistons shown, permit the second side 40 to move between the open and closed position, either with a mass of material 4 retained within the loader 20, or without. A removable cover, illustrated as shroud 50, may also be provided and placed on the ends 34,36 and the sides 38,40 so as to enclose the space 12. In this manner, as the material is being processed within the container 10, the amount of waste from material being propelled upward and carried away by wind is greatly minimized.

The cutter 14 may be in the form of a drum 52 which is rotationally driven about axis a—a. In order to process the material, the drum 52 may be provided with a plurality of blades 54 circumferentially affixed to the drum 52 and projecting outwardly therefrom into the space 12. Alternatively, flails 56 may be used, which flails 56 (or blades 54) may be individually removable from the drum 52, if desired. Other cutting implements, such as knives, hammer knives or disc blades are also ontemplated to be within the scope of the invention.

The loader 20 is preferably comprised of a first arm 60 which is connected to the second side 40 by means of the pivot connection 22. The first arm 60 extends outwardly from an end 62 of the second side 40 and may be adjustable in length by means of a telescoping arrangement of an outer part 64 and an inner part 66. At an end 68 of the first arm 60, there is a second arm 70 which extends normal to the first arm 60. In this manner, the second side 40, the first arm 60 and the second arm 70 define a U-shaped collection space 72 into which the mass of material 4 will be brought and retained. In order to operatively retain the mass of material 4, there is provided at least one, and preferably a spaced plurality of protrusions 74, shown as teeth but contemplated to be of sufficient size and configuration to securely engage a bale of fibrous material, similar to a grappling hook.

The movement of the loader 20 between the position 24 and the position 26 may be affected by a hydraulic means, such as pistons 76.

The whole apparatus 2 may be portable by being secured to a moveable support 80, such as a trailer, which is in turn hooked to a tractor 82 or similar vehicle. The power for the cutter 14 and the hydraulic means 46 and 76 may be taken from the power take off of the vehicle 82 by means of a direct connection 84, such as a planetary gearbox.

In use, therefore, the apparatus 2 may be mounted on the support 80 and attached to the vehicle 82 in a conventional manner, such that the apparatus 2 is powered by way of the power take off from the vehicle 82. The apparatus 2 may then be moved into a position alongside a mass of material 4, such as the rectangular hay bale shown in FIG. 1.

With the loader 20 in the ground position 24, the first arm 60 is hydraulically extended outwardly away from the container 10 until the length of the first arm 60 is sufficient to place the second arm 70 on the side of the mass remote from the container 10. In this manner, the mass will be positioned within the collection space 72. The first arm 60 can then be retracted as needed so that the loader 20 engages the mass 4 by means of the protrusions 74 extending into the mass 4.

Once the mass 4 is retained by the loader 20 within the collection space 74, the loader 20 may be pivoted upward, with the second side 40, toward the container 10 and the cutter 14, which is rotating. The mass of material 4 is brought into contact with the rotating cutter 14 in order to process the material. The loader 20, by means of its overall configuration and the protrusions 74 function as a grappling hook to securely retain the mass of material 4 in contact with the cutter 14 while the material is being processed, until all of the desired processing has been completed.

The shroud 50 may be placed on the container 10 before the operation begins if desired.

As the material is being processed, it can be selectively discharged from the container 10 to be spread on the ground for feed as a bed of material as required.

Once the operation is complete, the loader 20 can be left in the upright position 26, or lowered, and the operator (not shown) can then manouevre the apparatus 2 to the next mass of material 4 to be processed, as required. The loader 20 and second side 40 can then be lowered, if required, and the process can be repeated.

Thus, it is apparent that there has been provided in accordance with the invention an apparatus and method for use in the processing of a mass of material, such as a hay bale, that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

1. A processing apparatus for use in unpacking masses of material of interest including large bales of fibrous material of various shapes, said apparatus comprising:

(a) a container having a cutter within a space in said container, said cutter being rotationally driven about an axis, wherein said container comprises a bottom, a first and second end and a closed first side and a second side which is moveable between a first position in which said second side is open and a second position in which said second side is closed, so that said bottom, said first and second ends and said first and second sides define said space;

(b) an adjustable loader for releasably engaging said masses of material of interest and moving same into said container for engagement with said cutter, wherein said loader extends outwardly from said second side and forms a U-shaped collection space therewith and is provided with pivot connection means pivotally connecting said loader to said second side, said loader further comprising a first arm extending outwardly from an end of said second side and a second arm extending normal to said first arm and inwardly from said first arm so as to form said U-shaped collection space with said first arm and said second side, said first arm further comprising an outer arm segment and an inner arm segment in telescoping arrangement so as to permit adjustment of the length of said first arm and thereby the width of said U-shaped collection space to accommodate bales of a plurality of shapes and sizes; and (c) discharge device for selectively discharging processed material from said container.

2. The apparatus of claim 1 wherein said second arm comprises at least one protrusion extending from said second arm into said collection space towards said second side, said protrusion constructed so as to operatively retain said mass of material.

3. The apparatus of claim 1 further comprising a shroud removably connected to said first and second ends and said first side of said container so as to selectively cover said space.

4. The apparatus of claim 1 further comprising hydraulic cylinder means connected between said outer arm segment and said inner arm segment to actuate and control said telescoping arrangement.

5. The apparatus of claim 4 wherein said second arm comprises at least one protrusion member extending from said second arm into said collection space towards said second side, said protrusion member constructed so as to operatively retain said mass of material.

6. The apparatus of claim 5 comprising a plurality of said protrusion members spaced along said second arm.

7. The apparatus of claim 5 wherein said discharge device further comprises a discharge chute in said first side.

8. The apparatus of claim 1 wherein said cutter comprises a drum rotatable about said axis and having a plurality of unpacking devices selected from the group consisting of cutting blades and flails projecting outwardly therefrom.

9. The apparatus of claim 8 wherein said axis is generally horizontal.

10. The apparatus of claim 9 wherein said flails are removable.

11. The apparatus of claim 8 wherein said cutter comprises a plurality of flails affixed thereto and projecting outwardly therefrom.

12. The apparatus of claim 11 wherein said axis is generally horizontal.

13. The apparatus of claim 1 wherein said discharge device further comprises a discharge chute in said first side.

14. The apparatus of claim 1 further comprises a wheeled support means to carry said apparatus, said support means releasably attachable to a vehicle, and a drive connection means from a power take-off of a vehicle to drive said cutter.

15. The apparatus of claim 1 wherein said masses of material of interest comprise bales of a rectangular configuration containing fibrous material.

16. The apparatus of claim 15 wherein said fibrous material is selected from hay and straw.

17. A processing apparatus for use in unpacking masses of material of interest including large bales of fibrous material of various shapes, said apparatus comprising:

(a) a container having a cutter within a space in said container, said cutter being rotationally driven about an axis, wherein said container comprises a bottom, a first and second end and a closed first side and a second side which is moveable between a first position in which said second side is open and a second position in which said second side is closed, so that said bottom, said first and second ends and said first and second sides define said space;

(b) an adjustable loader for releasably engaging said masses of material of interest and moving same into said container for engagement with said cutter, wherein said loader extends outwardly from said second side and forms a U-shaped collection space therewith and is provided with pivot connection means pivotally connecting said loader to said second side, said loader further comprising a first arm extending outwardly from an end of said second side and a second arm extending normal to said first. arm and inwardly from said first arm so as to form said U-shaped collection space with said first arm and said second side, said first arm further comprising an outer arm segment and an inner arm segment in telescoping arrangement so as to permit adjustment of the length of said first arm and thereby the width of said U-shaped collection space to accommodate bales of a plurality of shapes and sizes;

(c) discharge chute device in said first side for selectively discharging processed material from said container; and (d) wherein said cutter comprises a drum rotatable about said axis and having a plurality of unpacking devices selected from the group consisting of cutting blades and flails projecting outwardly therefrom.

18. A method for the processing and discharge of a mass of material within an apparatus for use in unpacking masses of material of interest including fibrous material contained in large bales of various shapes, said apparatus comprising:

(a) a container having a cutter within a space in said container, said cutter being rotationally driven about an axis, wherein said container comprises a bottom, a first and second end and a closed first side and a second side which is moveable between a first position in which said second side is open and a second position in which said second side is closed, so that said bottom, said first and second ends and said first and second sides define said space;

(b) an adjustable loader for releasably engaging said masses of material of interest and moving same into said container for engagement with said cutter, wherein said loader extends outwardly from said second side and forms a U-shaped collection space therewith and is provided with pivot connection means pivotally connecting said loading means to said second side, said loading means further comprising a first arm extending outwardly from an end of said second side and a second arm extending normal to said first arm and inwardly from said first arm so as to form said U-shaped collection space with said first arm and said second side, said first arm further comprising an outer arm segment and an inner arm segment in telescoping arrangement so as to permit adjustment of the length of said first arm and thereby the width of said U-shaped collection space to accommodate bales of a plurality of shapes and sizes;

(c) discharge means for selectively discharging processed material from said container;

said method comprising the steps of:

moving said container into a position so that said second side is proximate to said mass;

lowering said loading means and adjusting the length which said loading means projects outwardly from said second side so as to engage said mass on a side of said mass remote from said second side;

bringing said loading means into contact with said mass so as to engage said mass;

lifting said loading means and said second side, with said mass being retained by said loading means, so as to bring said mass into contact with said cutter while said cutter is rotated so as to process said material; and discharging said processed material.

19. The method of claim 18 further comprising the step of holding said material in contact with said cutter while said processed material is discharged from said container until all of said material is processed.

* * * * *